US011254473B2

(12) United States Patent
Tobias (10) Patent No.: US 11,254,473 B2
(45) Date of Patent: *Feb. 22, 2022

(54) CUPS AND CONTAINERS WITH A LIVING HINGE AND SLEEVES

(71) Applicant: Clarity, Inc., Los Angeles, CA (US)

(72) Inventor: Glenn Tobias, Los Angeles, CA (US)

(73) Assignee: CLARITY, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,261

(22) Filed: Dec. 7, 2020

(65) Prior Publication Data

US 2021/0086958 A1    Mar. 25, 2021

Related U.S. Application Data

(63) Continuation-in-part of application No. 16/001,785, filed on Jun. 6, 2018, now Pat. No. 10,947,018.

(51) Int. Cl.
| | |
|---|---|
| *B65D 43/16* | (2006.01) |
| *B65D 1/26* | (2006.01) |
| *B65D 53/00* | (2006.01) |
| *B65D 81/38* | (2006.01) |

(52) U.S. Cl.
CPC .......... *B65D 43/162* (2013.01); *B65D 1/265* (2013.01); *B65D 53/00* (2013.01); *B65D 81/3876* (2013.01); *B65D 2251/10* (2013.01); *B65D 2251/20* (2013.01); *B65D 2543/00092* (2013.01); *B65D 2543/00296* (2013.01); *B65D 2543/00351* (2013.01)

(58) Field of Classification Search
CPC ...... B65D 43/162; B65D 1/265; B65D 53/00; B65D 81/3876; B65D 2251/10; B65D 2251/20; B65D 2543/00092; B65D 2543/00296; B65D 2543/00351
USPC .............................................. 220/839, 4.23
See application file for complete search history.

(56) References Cited

U.S. PATENT DOCUMENTS

| | | | |
|---|---|---|---|
| 1,203,195 | A | 10/1916 | Hanshue |
| 1,249,232 | A | 12/1917 | Squires |
| 2,201,713 | A | 5/1940 | Britten, Jr. |
| 3,137,431 | A | 6/1964 | Crouse |

(Continued)

FOREIGN PATENT DOCUMENTS

| | | |
|---|---|---|
| CA | 1249232 A | 1/1989 |
| EP | 2762418 A1 | 8/2014 |

(Continued)

*Primary Examiner* — J. Gregory Pickett
*Assistant Examiner* — Niki M Eloshway
(74) *Attorney, Agent, or Firm* — Cislo & Thomas, LLP (57) ABSTRACT

The present invention is directed to containers for holding non-food items having a living hinge and a quad or multi seal structure on the lid such that the seal created by the contact of the lid with the inside of the cup or container ensures a secure, friction fit orientation to prevent spillage or leakage of the contents therein. The quad or multi directional seal is created by multiple ribs on the lid that securably fit within the base of the container and indentations oriented in the bases, or by multiple ribs on the lid that securably fit within a channel structure in the top of the base of the container, the channel structure having the indentations in order to create a secure fit.

12 Claims, 6 Drawing Sheets

(56) References Cited

U.S. PATENT DOCUMENTS

| | | |
|---|---|---|
| 3,373,896 A | 3/1968 | Davis |
| 3,655,111 A | 4/1972 | Surerus |
| 3,674,512 A | 7/1972 | Andros |
| 3,696,987 A | 10/1972 | Schuff |
| D229,081 S | 11/1973 | Martinelli |
| 3,820,684 A | 6/1974 | Harrison et al. |
| 4,076,123 A | 2/1978 | Davis |
| 4,257,526 A | 3/1981 | Weits et al. |
| 4,508,235 A | 4/1985 | Steele et al. |
| 4,589,569 A | 5/1986 | Clements |
| 4,640,435 A | 2/1987 | Dutt |
| 5,270,011 A | 12/1993 | Altherr |
| 5,312,011 A | 5/1994 | Fischer |
| D359,882 S | 7/1995 | Birge, Jr. |
| D373,927 S | 9/1996 | Kramer |
| 5,820,016 A | 10/1998 | Stropkay |
| 5,897,019 A | 4/1999 | Stropkay |
| D417,845 S | 12/1999 | Sadlier et al. |
| D438,298 S | 2/2001 | McNutt |
| 6,422,024 B1 | 7/2002 | Foye |
| 6,824,003 B1 | 11/2004 | Wong |
| 6,955,289 B2 | 10/2005 | Green |
| D523,333 S | 6/2006 | Moretti |
| 7,124,910 B2 * | 10/2006 | Nordland ............. B65D 43/162 |
| | | 220/839 |
| D543,777 S | 6/2007 | Seum et al. |
| D553,441 S | 10/2007 | Mirpuri |
| D590,662 S | 4/2009 | Cheng |
| D591,595 S | 5/2009 | Tedford |
| D592,056 S | 5/2009 | Tedford |
| D610,875 S | 3/2010 | Wingfield et al. |
| D621,124 S | 8/2010 | Biegel |
| D621,659 S | 8/2010 | Liu |
| D641,631 S | 7/2011 | Kawahara et al. |
| D642,862 S | 8/2011 | Tobias |
| D642,863 S | 8/2011 | Tobias |
| D642,864 S | 8/2011 | Tobias |
| 8,100,289 B1 | 1/2012 | Tobias |
| D657,670 S | 4/2012 | Folos et al. |
| D658,057 S | 4/2012 | Donat |
| D664,001 S | 7/2012 | Liu |
| D672,610 S | 12/2012 | Park et al. |
| 8,336,732 B1 | 12/2012 | Tobias |
| D673,421 S | 1/2013 | Chiu et al. |
| 8,360,262 B2 * | 1/2013 | Vovan ............. B65D 43/162 |
| | | 220/522 |
| D683,186 S | 5/2013 | Tobias |
| D696,942 S | 1/2014 | Kim |
| D696,943 S | 1/2014 | Kim |
| D699,595 S | 2/2014 | Farrow et al. |
| 8,684,223 B1 | 4/2014 | Kalamaras |
| 8,701,887 B2 | 4/2014 | Baker et al. |
| 8,701,914 B1 | 4/2014 | Buck |
| 8,870,010 B2 | 10/2014 | Buck |
| D717,170 S | 11/2014 | Tan |
| D722,823 S | 2/2015 | Del Mar Menendez |
| 9,114,917 B1 | 8/2015 | Salem |
| D749,352 S | 2/2016 | Saber |
| D749,363 S | 2/2016 | Tacker et al. |
| D755,013 S | 5/2016 | Khubani et al. |
| 9,359,113 B2 | 6/2016 | Chen |
| D763,039 S | 8/2016 | Ionov |
| D763,620 S | 8/2016 | Szymanski |
| D763,621 S | 8/2016 | Szymanski |
| D773,895 S | 12/2016 | Dai |
| D773,896 S | 12/2016 | Dai |
| D784,081 S | 4/2017 | Szymanski |
| D784,082 S | 4/2017 | Yao |
| D789,743 S | 6/2017 | Washburn et al. |
| D794,390 S | 8/2017 | Boettcher Sebben |
| D795,643 S | 8/2017 | Barlow |
| D815,489 S | 4/2018 | Yan et al. |
| D815,906 S | 4/2018 | Yee et al. |
| 9,950,845 B2 | 4/2018 | Hsieh |
| D820,480 S | 6/2018 | Kaliroff |
| D823,687 S | 7/2018 | Kelly |
| D836,973 S | 1/2019 | Masifilo |
| D851,994 S | 6/2019 | Brady et al. |
| 10,322,856 B2 * | 6/2019 | Giraud ............. B65D 43/162 |
| D873,613 S | 1/2020 | Tobias |
| 10,663,512 B2 * | 5/2020 | Wu ............. G01R 31/2889 |
| 2003/0052018 A1 | 3/2003 | Wilson |
| 2004/0178207 A1 | 9/2004 | Kim |
| 2005/0173507 A1 * | 8/2005 | Green ............. B65D 3/20 |
| | | 229/404 |
| 2005/0189361 A1 | 9/2005 | Bresler |
| 2006/0071008 A1 | 4/2006 | Sadlier |
| 2006/0289549 A1 | 12/2006 | Vovan |
| 2007/0169506 A1 | 7/2007 | Heuschober |
| 2007/0228134 A1 | 10/2007 | Cook et al. |
| 2008/0006643 A1 | 1/2008 | Ma |
| 2008/0035658 A1 * | 2/2008 | Caulfield ............. B65D 43/162 |
| | | 220/839 |
| 2011/0068114 A1 | 3/2011 | Colby |
| 2011/0180552 A1 | 7/2011 | Sarson |
| 2011/0303678 A1 | 12/2011 | Zomorodi et al. |
| 2011/0309093 A1 | 12/2011 | Buck |
| 2012/0024877 A1 | 2/2012 | Tobias |
| 2012/0125931 A1 | 5/2012 | Roth et al. |
| 2012/0174795 A1 | 7/2012 | Uspenski et al. |
| 2013/0119065 A1 | 5/2013 | Buck |
| 2014/0231445 A1 | 8/2014 | Possell et al. |
| 2014/0367296 A1 | 12/2014 | Berger et al. |
| 2015/0014333 A1 | 1/2015 | Greer |
| 2015/0225146 A1 | 8/2015 | Paz Luis |
| 2016/0083151 A1 | 3/2016 | Stahlecker |
| 2017/0096281 A1 | 4/2017 | Tiesberger et al. |
| 2017/0181556 A1 | 6/2017 | Lai |
| 2017/0362001 A1 | 12/2017 | Buck |

FOREIGN PATENT DOCUMENTS

| | | |
|---|---|---|
| JP | 2000043915 A | 2/2000 |
| JP | 2010517882 A | 5/2010 |
| JP | 1436977 | 8/2014 |
| WO | 2013034289 A1 | 3/2013 |

* cited by examiner

CUPS AND CONTAINERS WITH A LIVING HINGE AND SLEEVES

CROSS-REFERENCES TO RELATED APPLICATIONS

This patent application is a continuation-in-part application of patent application Ser. No. 16/001,785 filed. Jun. 6, 2018, published on Dec. 12, 2019 as 2019/0375560. This patent application is related to U.S. Design patent application No. 29/721,976 filed on Jan. 24, 2020 entitled "Cup With A Lid"; U.S. Design patent application No. 29/722,025 filed on Jan. 24, 2020 entitled "Container With a Lid"; U.S. Design patent application No. 29/722,104 filed Jan. 27, 2020 entitled, "Living Hinge on a Cup or Container"; U.S. patent application No. 29/722,119 filed Jan. 27, 2020 entitled, "Cup or Container Having an Exterior Thermal Ribbing" and U.S. patent application No. 29/721,999 filed on Jan. 24, 2020 entitled "Cup or Container With a Lid", all of which are divisional applications of U.S. Design Pat. No. D873,613 issued on Jan. 28, 2020 from an application filed on Jun. 7, 2018 entitled. "Cup With A Lid"; and is also related to U.S. Design Pat. No. D885,838 issued on Jun. 20, 2020 based upon patent application No. 29/650,521 filed on Jul. 9, 2019 entitled "A Cup With a Living Hinge and An Attached Lid Having An Outer Lip." Each of those applications and patents is incorporated here by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to one-piece, easily recyclable, sealable, non-leaking containers for holding non-food items with a receptacle portion and a lid attached to the receptacle with a living hinge. The cups and containers are preferably made of a recyclable resin or polypropylene, or other resins such as injection grade ABS, polycarbonate, PE, PC-ABS, PMMA and others depending on the purpose of the product. The inventive containers are of a structure and material that allow manufacturing in a quick and efficient manner.

BACKGROUND ART

There are a number of prior art references in this field, including U.S. Pat. Nos. 3,373,896; 4,076,123; 4,257,526; 4,640,435; 5,270,011; 5,312,011; 5,820,016; 6,955,289; 8,100,289; 8,336,732; 8,701,887; 8,701,914; D642,863; D642,862; D642,864; D683,186; and U.S. Published Application Nos. 2017/0096281 and 2012/0024877.

Each of these patents or published applications has one or more deficiencies such as collapsing when full, complicated for a user or complicated to manufacture, multi-stream recycling requirements, leaking, slow and inefficient manufacturing processes, expensive manufacturing processes, or bulky and not portable in large quantities. These shortcomings necessitate the need for one-piece, recyclable, sealable, non-leaking cups and containers for holding non-food items with a receptacle portion and a lid attached to the receptacle with a living hinge, a dual seal, and optionally, a fluid diverter as described in this invention.

DISCLOSURE OF INVENTION

The present invention is a substantial improvement in utility and functionality from standard cup and lid combinations and overcomes the deficiencies in the art by achieving one-piece, totally recyclable, sealable, non-leaking containers for non-food items with a receptacle portion and a lid attached to the receptacle with a living hinge. The containers are suitable for numerous non-food applications requiring packaging that is secure and does not leak, for example, containers to hold hairceutical and cosmeceuticals like shampoo, conditioner, makeup, hair color, lotions, and pastes. Additional applications include veterinary packaging of drugs, tools, dressings, and syringes; feminine products like tampons and sanitary napkins; agricultural packaging of seeds, fertilizer, and soil; glasses holders, contact lenses packaging, and eye solution packaging; retail packaging such as packaging for blankets, pillows, and utensils; garment packaging for socks, underwear, t-shirts, and the like; baby product related packaging for diapers, wipes, and balm; fishing packaging; ammunition packaging; manufacturing floor packaging such as electronic boards, chip druids used by manufacturers during the manufacturing process; chemical packaging for grease, paint, cleansers, and pool and spa products.

The inventive containers may include the non-food substances directly, or they may provide a housing for substances that are packaged in further receptacles suited for the composition. For example, tubes of hair color may be contained within the inventive packaging to ensure no contamination or breakage of the contents.

The containers are made by injection molding in an efficient manner using molds that can manufacture approximately multiple cups every minutes. The material used for the inventive cups and containers, the claimed shapes and features of the cups and containers, the material of the mold, and the properties of the molding machine have all been taken into account in designing the embodiments disclosed and claimed herein as each unique feature has been carefully designed to facilitate the injection molding process. Because of the unique features, the process is efficient, high output, and provides a minimal impact on the injection molding machine to ensure longevity of the mold resulting in a highly economical manufacturing process that produces virtually leak free sealing cups and containers that are easily stacked, shipped, stored, and used.

Here, the injection molding operation creates all three parts, lid, hinge, and lower receptacle portion at one time as a single piece. The manufacturing components are controlled electronically resulting in an efficient manner of production and a decrease in the amount of spillage from the cups or containers, if any, by creating accurate measurements and output of the upper, inner quad or multidirectional seal in the receptacle portion, in the living hinge, on the edge of the lid, and on the contouring of the top of the lid. The manufacturing of the inventive cups, containers, and sleeves undercuts the cost of manufacturing paper cups, containers, and sleeves significantly. Further, the inventive design of the hinge is structured such that the mold used to make the cups and containers does not wear out. Specifically, the hinge radius is designed for mold flexibility and ejection requiring less ejection pressure.

Also, the design of the inventive cups, containers, and sleeves has been carefully honed to the presently claimed invention such that manufacturing time per unit is significantly reduced to less than 10 seconds per cup or container. This makes the inventive products commercially feasible and competitive pricewise with existing processes of paper cups with a poly lining or polystyrene foam cups, which are highly polluting to the environment as nearly 600 billion foam and paper cups enter the waste stream annually according to the International Coffee Organization. To date, prior art foam and paper cups frequently end up in the landfill or in the ocean as plastic pollution.

In particular, the inventive designs put less pressure on the costly manufacturing molds providing longevity of approximately 15-20 years of use on the same machine, and allow for quick compression and turn-around time. This results in increased savings as molds may cost over hundreds of thousands of dollars and more per machine.

By contrast, the prior art molded cups with a lid attached had a manufacturing time of over a minute per cup, container, or sleeve and did not function as well as the inventive designs. For example, the prior art designs of a cup with a built in lid were unstable, easily fell over or collapsed when liquid was inside, the seal created between the lid and the lower receptacle leaked and did not stabilize the structure because of the lack of a dual seal or fluid diverting structure, and it was difficult to commercially manufacture them. These inefficient designs caused increase friction on the molds causing the molds to wear out quickly, for example, after 5 years of use, thereby further decreasing the profitability of the designs.

Accordingly, the inventive embodiments disclosed provide a substantial improvement over prior patents of a cup or container with a built in lid as to function, leak proofing seal, and commercial manufacturing feasibility.

The inventive container is molded and totally sealable and capable of holding non-food items without leaking. The container comprises a lower, receptacle portion having a base, an open top, and side walls in between the base and the open top, the base having a smaller diameter than the top, or a diameter that is consistent with the opening in the top, the side walls forming a cylinder from the base to the open top and creating an inner and outer portion of the container, the open top having an upper edge defining the outermost circumference of the open top and a living hinge with a flexible radius and two or more indentations that run the full circumference of the inner portion of the container below the upper edge; the living hinge molded in the upper edge of the open top attached to the lower receptacle portion and a lid, the living hinge allowing the lid to flex over the open top wherein the lid securably fits into the multiple indentations that run the full circumference of the inner portion of the container; the lid having a top surface and a bottom surface of a size and shape to securably fit into the inner circumference of the open top of the container, the top surface of the lid being sloped downward from the outermost circumference of the open top to the center of the lid, the circumference around the bottom surface of the lid having a lip extending down from the circumference of the lid, the lip creating a quad-directional or multi-directional seal structure having a two, three, four, or more edges that fit in the indentations, the number of indentations corresponding to the number of lips on the lid, that run the full circumference of the inner portion of the container and a top edge that is the same size and shape as the inner circumference of the upper edge of the top, the top edge optionally having one or more l-shaped tabs or other tabs to assist in opening the lid extending from the top edge up and over the upper edge of the container; wherein the living hinge permits the lid to bend along a line of the hinge to flexibly secure the lid to the container and prevent leakage of the material held therein.

The internal quad-directional or multi-directional sealing surfaces on the lip of the lid extending down from the circumference of the lid exhibit multiple radius' of male/female horizontal seals combined with flat vertical seals of the same length that are injection molded and which can be adapted to all other forms of molding including vacuum or thermal-forming via dual "skirting" features. Accordingly, the structure provides for a secure seal to virtually prevent all fluid and contents leakage when the lid is locked properly within the indentations running the circumference of the inner portion of the cup. Also, a fluid diverter on the top of the lid may ensure that all fluids or contents flow away from the seal and towards the top center of the lid. This prevents puddling at the lid-wall intersection. The fluid diverter can be positioned throughout the entire top circumference of the lid, including on the living hinge to ensure the most effective seal and flow of liquids away from the edge. This helps when opening the cups too to prevent any contents from dripping on the user unnecessarily. The quad-directional or multi-directional seal is included in all cups and containers.

In some embodiments, the lid has a small opening opposite the living hinge to allow liquid to pass through, or to accommodate any needs of the contents therein. Also, the containers can be easily stacked because of an optional inner concentric circular material on the inside of the container just above the base. This inner portion of the container above the base has a concentrically molded lip extending the circumference of the inner portion of the container on the sidewall just above the base. This concentrically molded lip allows containers to be stacked together and easily removed because the base of each container maintains a distance from a second container and does not cause the containers to stick together.

The living hinge of the container is thin and flexible with a flexible radius, having the same thickness as the rest of the container and made from the same material as the lower portion of the container and the lid, the flexible radius allowing for the lid to bend along the line of the hinge and securely fit within the top inside of the container. The flexible radius is positioned in a break in the top circumference of the container, the break in the circumference having two arcuate edges on either side of the living hinge extending from the flexible radius of the living hinge up to the upper edge.

The arcuate edges ensure that there is no wear and tear on the living hinge, provide minimal friction, and allow for a smooth opening and closing movement. The top of the living hinge on the top of the lid of the container is also curved, maintaining the same curve as the inner circumference of the container. The curved shape of this portion of the hinge ensures that any additional liquid material on the top of the lid is directed downward and away from the seal. Furthermore, the overall shape of the living hinge and the arcuate edges in the break in the circumference ensure a secure seal between the lid and the bottom portion of the container. In addition, the shape allows efficient molding and removal of the container from the mold in the manufacture of the cup such that the molds are not worn unnecessarily and manufacturing can be done quickly and faster than prior molding processes.

The lid of the cups or containers fits down within the lower receptacle portion of the cup or container and ensures that the quad- or multi-directional seal created is secure and ensures the cup or container is stable and secure.

The inventive containers may be round in shape similar to the cups or may be rectangular or square to accommodate the respective non-food articles or substances intended to be included in the container. All of the containers have the same living hinge and are made of the same material as the containers. They are molded and totally sealable and capable of holding liquid or food without leaking. The containers comprises a lower, receptacle portion having a base, an open top, and side walls in between the base and the open top, the base being round, substantially rectangular or square, and having a smaller area at the bottom than the top, the side walls forming a cylinder if the container base is round, or side walls in a rectangular or square shape if the base is rectangular or square, respectively, all side walls emanating from the base to the open top and creating an inner and outer portion of the container, the open top having an upper edge defining the outermost circumference of the open top and a living hinge with a flexible radius and an indentation that runs the full circumference of the inner portion of the container below the upper edge; the living hinge molded in the upper edge of the open top attached to the lower receptacle portion and a lid, the living hinge allowing the lid to flex over the open top wherein the lid securably fits into two or more indentations that run the full circumference of the inner portion of the container; the lid having a top surface and a bottom surface of a size and shape to securably fit into the inner circumference of the open top of the container, the top surface of the lid being sloped downward from the outermost circumference of the open top to the center of the lid, the circumference around the bottom surface of the lid having a lip extending down from the circumference of the lid, the lip creating a quad- or multi-directional seal structure having two or more ribs around the circumference of the lip of the lid, the two or more ribs fitting into two or more corresponding indentations that run the full circumference of the inner portion of the container and a top edge that is the same size and shape as the inner circumference of the upper edge of the top, the top edge having one or more l-shaped tabs or other shaped structure to assist in opening the container, the l-shaped tabs extending from the top edge up and over the upper edge of the cup; wherein the living hinge permits the lid to bend along a line of the hinge to flexibly secure the lid to the container and prevent leakage of the material held therein.

The containers may have an opening in the lid to let steam escape, to pour liquid out, or to accommodate the needs of the contents therein.

The material used to manufacture the cups, containers, and sleeves is preferably a resin, polypropylene, or other similar recyclable and moldable material. Alternative materials may include a bioresin that is biodegradable and compostable creating a similar, singular stream of recycling as the use of the resin polypropylene. Additional materials include injection grade ABS, polycarbonate, PE, PC-ABS, PMMA and more, with varying needs and requirements to suit the contents. The cups or containers may be sealed using various sealing methodologies and technology such as, but not limited to, sonic welding, sonic spin welding, heat stacking, and more. Because the inventive embodiments use a single material for the cup and lid, container and lid, and any labels for the foregoing, they are totally recyclable and can be reground into a usable resin straight from a recycling bin.

Further, an advantage of the cups and containers being the same material as the sleeves is that the inventive items create a single stream of recycling because there are no separation requirements. The container, lid, and any printed labels on the cups or containers are made of the same single resin or bioresin and are truly recyclable or degradable.

By contrast, existing prior art cups, containers, and lids are comprised of layers of one or more materials or are a combination of paper and plastic that complicate the recycling process. In order to recycle cups and containers that are comprised of layers, they must be stripped into their component parts in order to recycle them. For example, Tetra™ packs that hold many food and liquid items are lined with a material that must be stripped from the outer material before recycling. Paper cups used at coffee shops with a high volume of consumers are coated with a thin plastic lining to prevent leaks. Many containers for industrial or consumer products that may house products suited for the inventive cups and containers may also be made of many different materials rendering them difficult to recycle or not recyclable at all.

Cups or containers having multiple layers are more challenging to recycle because the plastic is not easy to separate from the paper. Currently, there are very few cities that have the proper infrastructure in place to process such "layered" or lined cups and containers. While New York, Seattle, and Washington D.C. are three of the cities that can tackle this complex process, cities without this capability end up putting the prior art cups and containers in a landfill. Also, it is much less expensive for large coffee shops to send their lined paper cup waste and plastic lids to a landfill than to locate outlets to process the cups in order to compost and recycle them.

Further, paper cups and containers contaminated with grease or chemical residue, which commonly occurs when containers hold non-food products and compositions, or when cups or containers are placed in a recycling bin with other greasy materials, cannot be recycled at all. In sum, recyclable and compostable packaging is only beneficial if it ends up at a waste facility that can process it. Many compostable cups and containers will not breakdown in a backyard composter because they do not get hot enough, or even in a landfill where waste decomposes through an anaerobic process producing methane, a greenhouse gas. And, compostable cups and containers can be contaminants at a recycling facility.

Here, the inventive cups, containers, and label are made in the same resin and can be discarded without the need for the separation by the user or processor. This resolves the conflicts and confusion in the recycling industry where single-stream bins now include paper bonded with polyactic acid linings that can only be removed or separated in the few cities with the expensive infrastructure to do so. These along with the mixed plastic resin cups that contaminate recycling grounds if not separated are among the vast majority of the 600 billion paper and plastic cups produced annually that end up in landfills every year.

More stringent measures to reduce this waste are in the works as many cities and municipalities are considering a tax on single use prior art paper cups or banning them outright. The inventive cups, containers, and labels resolve this problem in the art as they are multiple use, reusable, and totally recyclable or biodegradable.

An alternative method of production of the cups, containers, and sleeves may include 3-D printing, thermoforming, or vacuum thermoforming.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
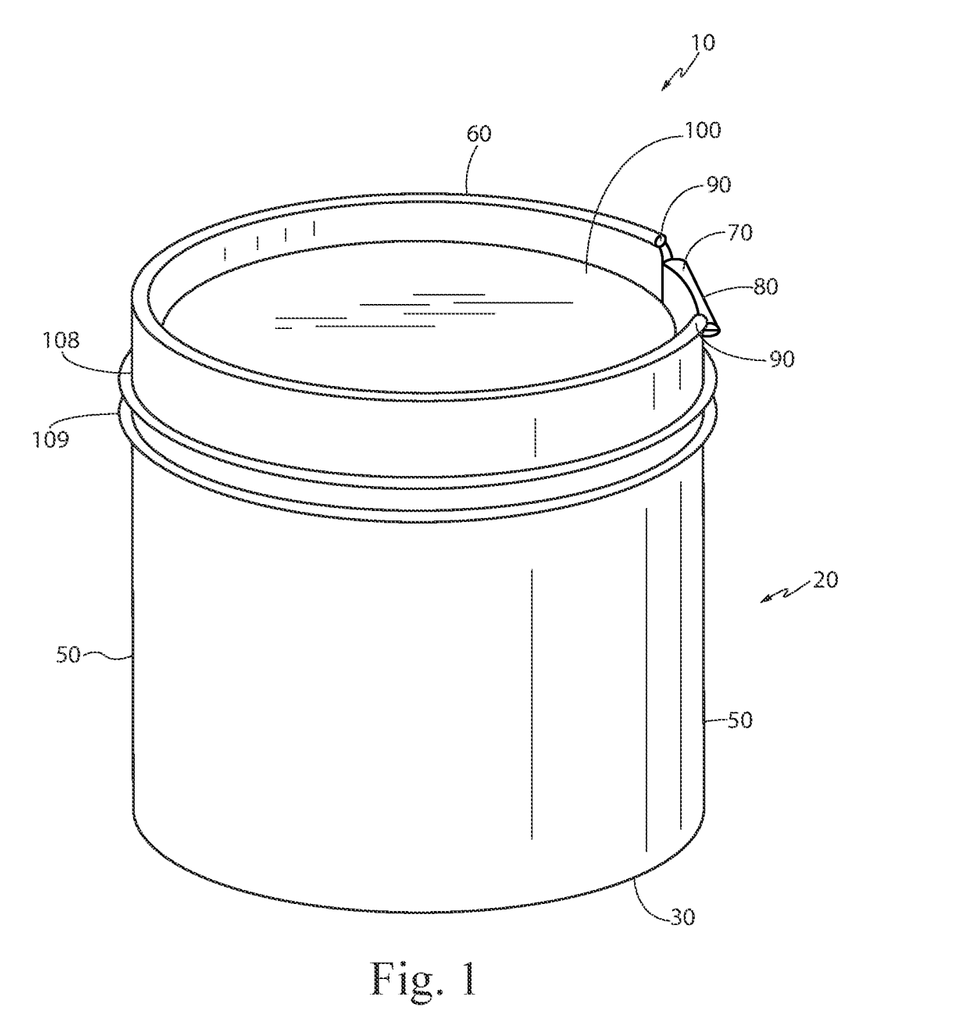
FIG. 1 is a perspective view of a container with a living hinge and a lid having an inner quad seal with an inset lid in the closed position.

FIG. 1 is a perspective view of a container with a living hinge and a lid having an inner quad seal with an inset lid in the closed position. The molded, sealable cup for holding non-food items 10 has a lower, receptacle portion 20 having a base 30, an open top 40 when the lid is open (shown in FIG. 2), and side walls 50 in between the base and the open top, the base having the same diameter as the top, the side walls forming a cylinder from the base to the open top and creating an inner and outer portion of the container, the top having an upper edge 60 defining the outermost circumference of the top and a living hinge 70 with a flexible radius 80 and two arcuate edges 90 around the hinge 70. The living hinge 70 is molded in the upper edge of the top 60 attached to the lower receptacle portion 20 and a lid 100, the living hinge 70 allowing the lid 100 to flex over the open top wherein the lid 100 securably fits into the two indentations 108 and 109 that run the full circumference of the inner portion of the cup, wherein the quad seal ensures that the outer circumference of the lid contacts the inner circumference of the cup to ensure a secure seal. These internal quad-directional sealing surfaces exhibit a radius male/female horizontal seal combined with a flat vertical seal of some length that is injection molded and which can be adapted to all other forms of molding including vacuum or thermal-forming via dual "skirting" features.

The living hinge 70 is designed for mold flexibility and ejection requiring less ejection pressure.

The lid may have a small opening 130 opposite the living hinge to allow liquid to pass through and a small breathe hole adjacent to the living hinge to allow for the smooth flow of the liquid though the small opening when one is drinking. The small breathe hold prevents the suction of the liquid created when trying to pour the fluid out of the cup. Also, the base of the inner portion of the container may have a concentrically molded lip extending the circumference of the inner portion of the cup on the sidewall just above the base wherein the concentrically molded lip allows containers to be stacked together and easily removed. In stacking the containers, the base of a second container may sit on top of the concentrically molded lip of a first container and the living hinges and lids line up. Multiple containers can be stacked upon one another and easily separated. Disposable containers in the prior art may not have this feature resulting in containers sticking together when stacked and requiring complicated dexterity from a user to separate the containers. By contrast, the inventive containers may be selected from a stack by a user and easily separated without sticking due to the concentrically molded lip allowing quick access of a single container.

In addition, the upper edge of the container 60 has a break in the circumference to accommodate the living hinge 70, the break in the circumference having two arcuate edges 90 on either side of the living hinge extending from the flexible radius 80 of the living hinge 70 up to the upper edge 60.

The container shown in FIG. 1, along with all other embodiments of containers disclosed herein may have a built-in insulation sleeve comprised of vertical concentric ribs that rise above the surface of the lower receptacle portion and insulate the container, but do not interfere with stacking or manufacturing. The raised ribs are made of the same material as the container.

The container shown in FIG. 1, along with all other embodiments of containers disclosed herein may have a label wrapping around the outside of the container made of the same material as the container so nothing has to be peeled off or changed prior to placing the inventive container into the recycling stream. The labels may be clear, colored, white and have a smooth texture or an "orange peel" slightly rough texture. Product names, pictures, and text may be added to the labels. Also, the labels can be added during the injection molding process so that manufacturing is not complicated by the addition of the label.

Figure 2:
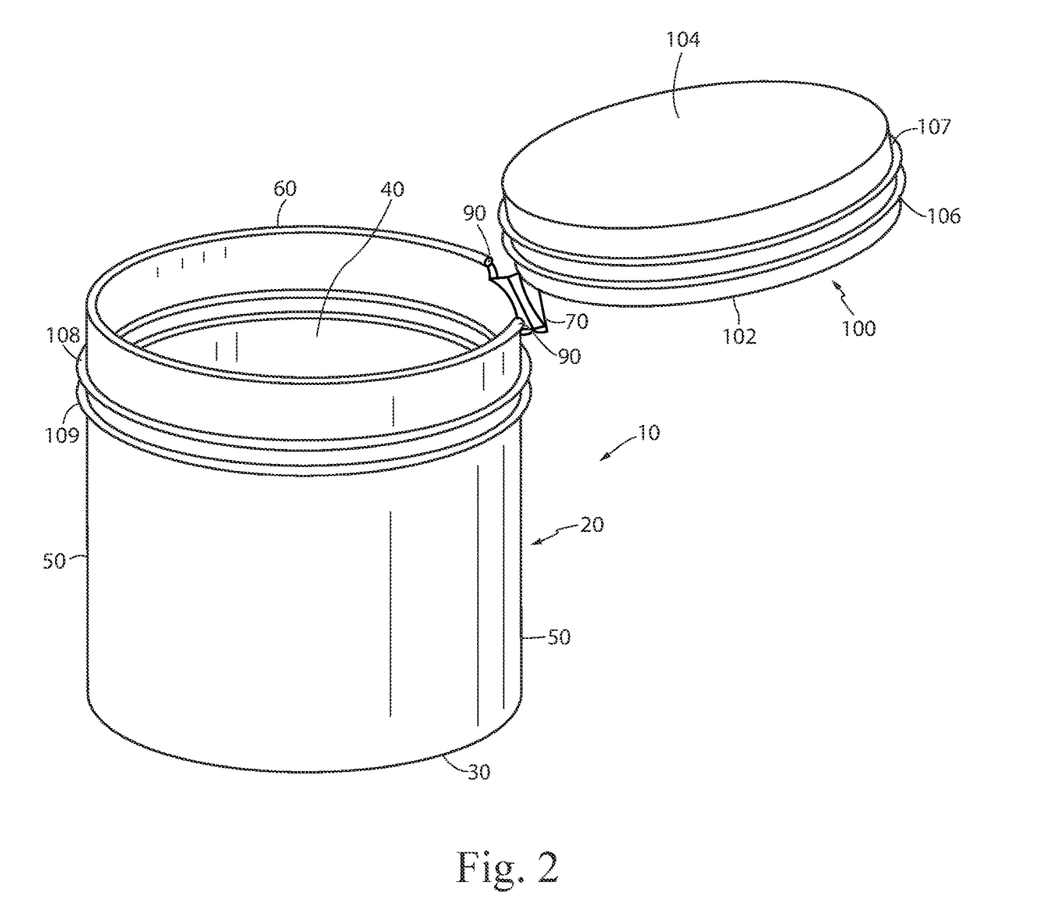
FIG. 2 is a perspective view of the container with the lid in the open position.

FIG. 2 is a perspective view of the container 10 with the lid 100 in the open position. The molded, sealable cup for holding non-food items 10 has a lower, receptacle portion 20 having a base 30, an open top 40 when the lid is open, and side walls 50 in between the base and the open top, the base having the same diameter as the top, the side walls forming a cylinder from the base to the open top and creating an inner and outer portion of the container, the top having an upper edge 60 defining the outermost circumference of the top and a living hinge 70 with a flexible radius 80 and two arcuate edges 90 around the hinge 70. The living hinge 70 is molded in the upper edge of the top 60 attached to the lower receptacle portion 20 and a lid 100, the living hinge 70 allowing the lid 100 to flex over the open top wherein the lid 100 securably fits into the two indentations 108 and 109 that run the full circumference of the inner portion of the cup, wherein the quad seal ensures that the outer circumference of the lid contacts the inner circumference of the cup to ensure a secure seal. These internal quad-directional sealing surfaces exhibit a radius male/female horizontal seal combined with a flat vertical seal of some length that is injection molded and which can be adapted to all other forms of molding including vacuum or thermal-forming via dual "skirting" features.

The lid structure 100 has a top surface 102 and a bottom surface 104 of a size and shape to securably fit into the inner circumference of the open top of the cup 40, the circumference around the bottom surface of the lid having a lip extending down from the circumference of the lid 106, the lip 106 creating a quad seal structure having a first edge 106 that fits in the indentation that runs the full circumference of the inner portion of the cup 108 and a second edge 107 that fits in the second indentation that runs the full circumference of the inner portion of the cup 109 and a top edge that is the same size and shape as the inner circumference of the upper edge of the top. The living hinge 70 of the present invention permits the lid 100 to bend along a line of the hinge to flexibly secure the lid 100 to the lower portion of the cup 20 and prevent leakage of the material held therein.

Figure 3:
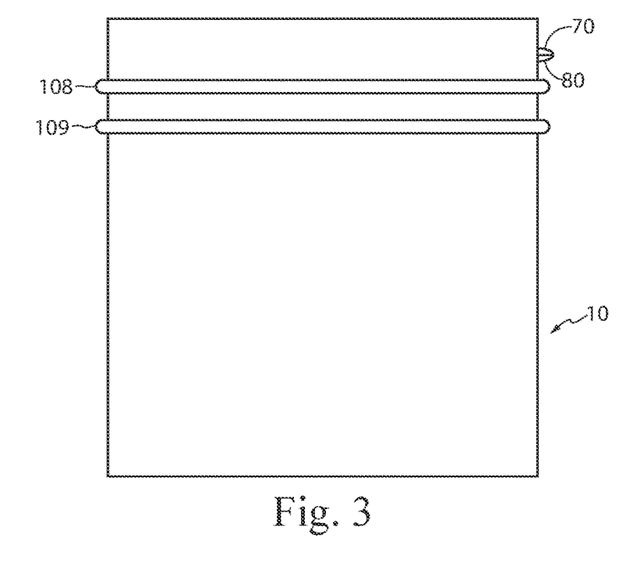
FIG. 3 is a right side view thereof with the lid on the container in the closed position.

FIG. 3 is a side view of the container 10 with a living hinge 70 and the flexible radius 80 showing the lid in the closed, friction fit position. The outer ribs 108 and 109 of the quad seal structure are shown.

Figure 4:
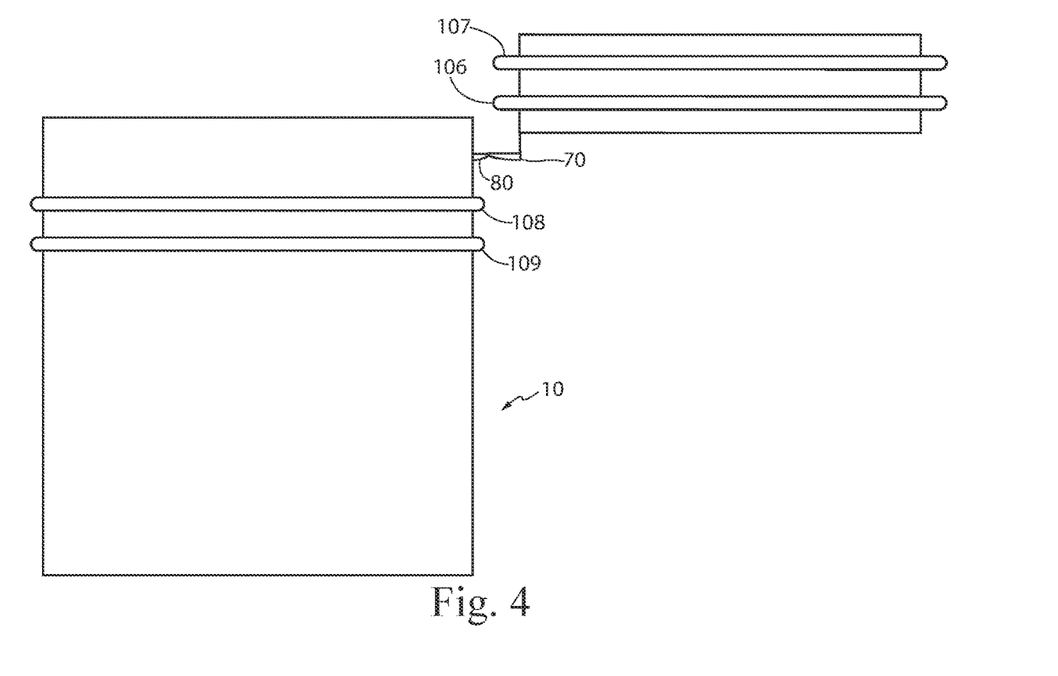
FIG. 4 is a tight side view thereof with the lid on the container in the open position.

FIG. 4 is a side view of the container 10 with a living hinge 70 and the flexible radius 80 showing the lid in the open position. The outer ribs 108 and 109 of the quad seal structure are shown, as well as the inner ribs on the lid 106 and 107. The inner ribs 106 and 107 fit into the outer ribs 108 and 109, respectively in order to create a secure, quad directional seal that ensures no or minimal leakage of the contents.

Figure 5:
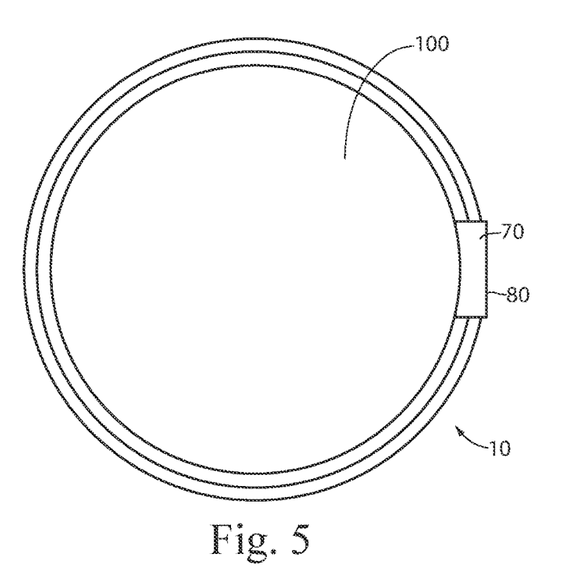
FIG. 5 top view thereof with the lid on the container in the closed position.

FIG. 5 is a top view of a container 10 with a living hinge 70 and a flexible radius 80 and the lid 100 in the closed position. The lid 100 fits within the open top 40 (shown in FIG. 2) of the cup 10.

Figure 6:
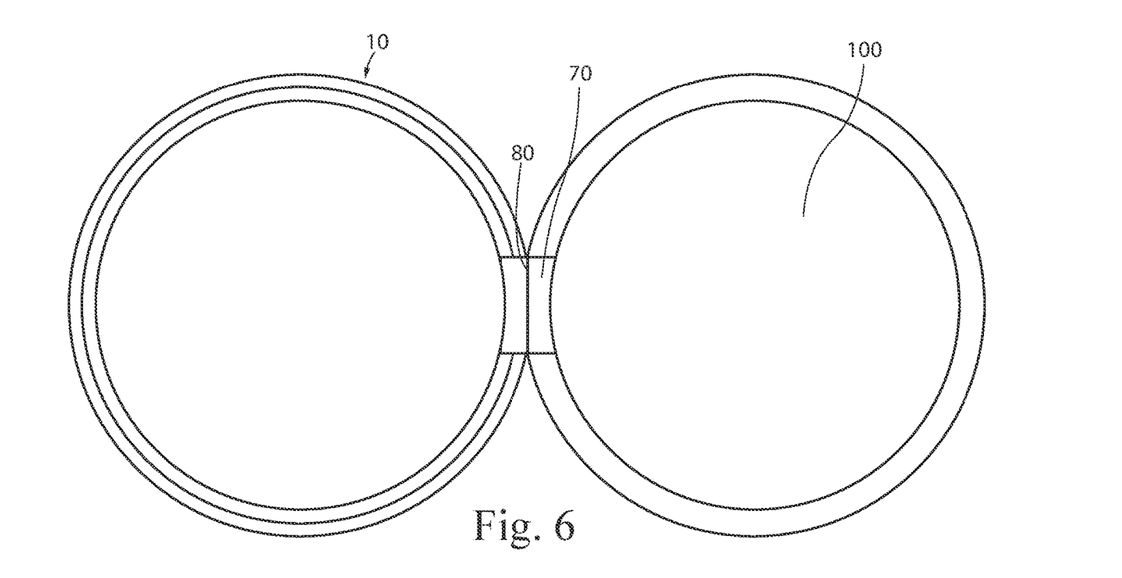
FIG. 6 top view thereof with the lid on the container in the open position.

FIG. 6 is a top view of a container 10 with a living hinge 70 and a flexible radius 80 and the lid 100 in the open position.

Figure 7:
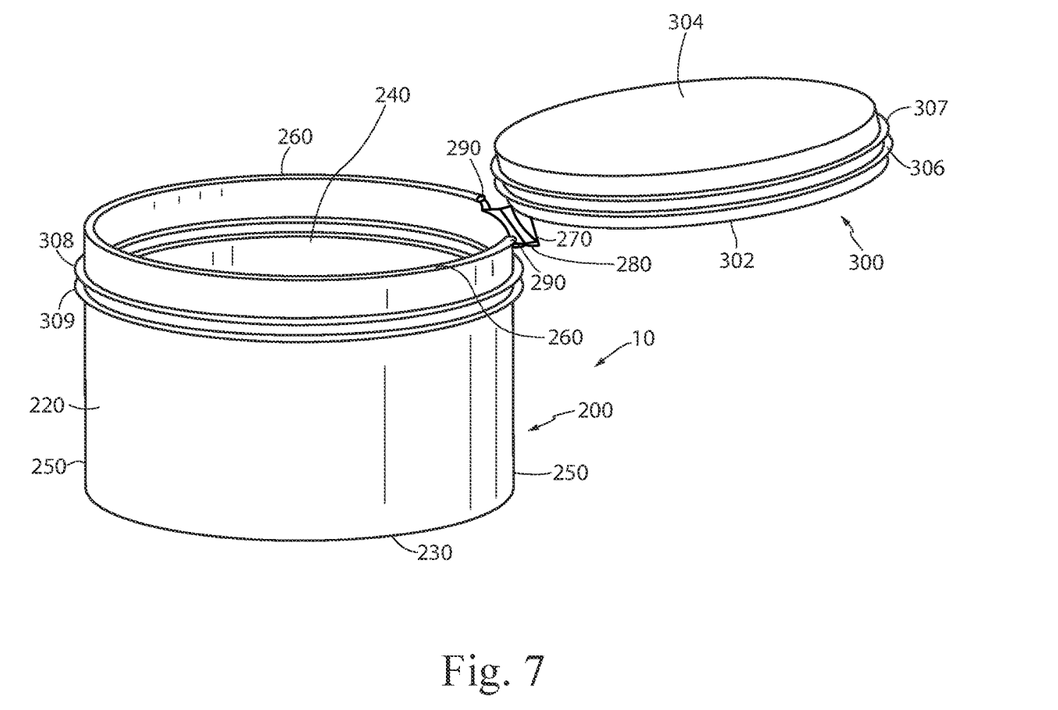
FIG. 7 is a perspective view of a container with the lid in the open position with an inner channel that will receive the lower portion of the lid.

FIG. 7 is a perspective view of the container 200 with the lid 300 in the open position. The molded, sealable container for holding non-food items 200 has a lower, receptacle portion 220 having a base 230, an open top 240 when the lid is open, and side walls 250 in between the base and the open top, the base having the same diameter as the top, the side walls forming a cylinder from the base to the open top and creating an inner and outer portion of the container, the top having an upper edge 260 defining the outermost circumference of the top and a living hinge 270 with a flexible radius 280 and two arcuate edges 290 around the hinge 270. The living hinge 270 is molded in the upper edge of the top 260 attached to the lower receptacle portion 220 and a lid 300, the living hinge 270 allowing the lid 300 to flex over the open top wherein the lid 300 securably fits into the two indentations 308 and 309 that run the full circumference of an inner channel 400 of the inner portion of the container, the lower lip of the lid 300 having outer channel ribs 306 and 307 that fit within the inner channel 400 and meet with the two indentations 308 and 309 to ensure a secure channel set quad seal. These internal quad-directional sealing surfaces within an inner channel exhibit a radius male/female horizontal seal combined with a flat, vertical seal of some length that is injection molded and which can be adapted to all other forms of molding including vacuum or thermal-forming via dual "skirting" features.

The lid structure 300 has a top surface 302 and a bottom surface 304 of a size and shape to securably fit into the inner channel set in the inner circumference of the open top of the container 240, the circumference around the bottom surface of the lid having a lip extending down from the circumference of the lid 305, the lip 306 creating a quad seal structure having a first edge 306 that fits in the indentation that runs the full circumference of the inner portion of the container 308 and a second edge 307 that fits in the second indentation that runs the full circumference of the inner portion of the cup 309, both of the indentations 308 and 309 being formed within a channel in the inner circumference of the upper edge of the top, and the lip of the lid of a size and shape with ribs 306 and 307 that securely fit within the channel. The living hinge 270 of the present invention permits the lid 300 to bend along a line of the hinge to flexibly secure the lid 300 to the lower portion of the container 220 and prevent leakage of the material held therein.

Figure 8:
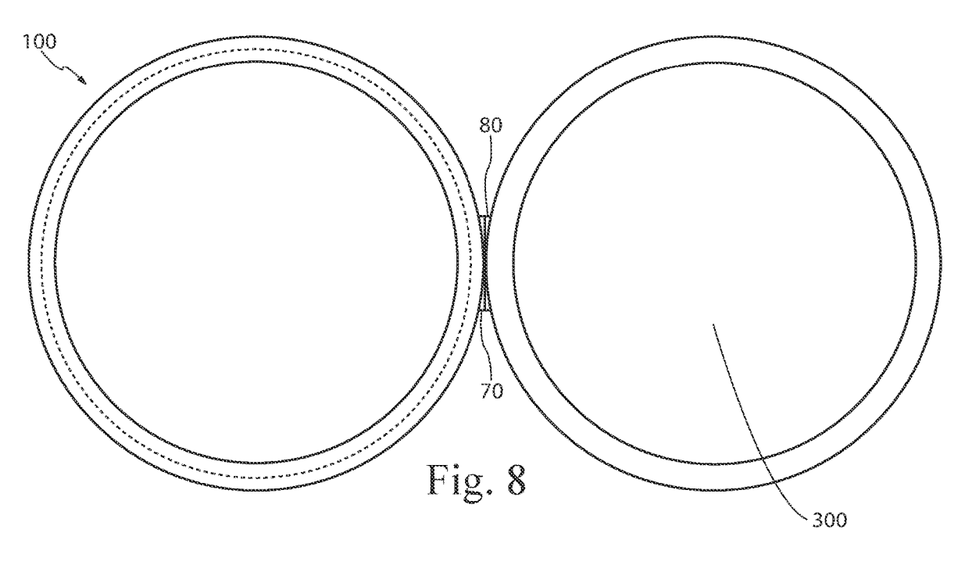
FIG. 8 is a top view of the container with the lid in the open position with the inner channel that will receive the lower portion of the lid shown with a dashed line.

FIG. 8 is a top view of the container showing the open channel of the quad sealing structure, the opening of the channel shown in dashed lines.

All of the foregoing include multiple quad-directional seals creating two or more sets of sealing features and the quad-directional sealing feature incorporated on the lid sealing on the outside as well as the interior.

While the present invention has been described with regards to particular embodiments, it is recognized that additional variations of the present invention may be devised without departing from the inventive concept.

INDUSTRIAL APPLICABILITY

This invention may be industrially applied in many different fields requiring disposable or reusable, sealable containers, including food; aerospace; home goods; sports; medical settings for specimen collection, dosing medicine, and administering liquids; and educational industries and settings.

What is claimed is:

1. An injection molded, sealable container made from molten polypropylene for holding non-food items comprising
(a) a lower, receptacle portion having a base, an open top, and side walls in between the base and the open top, the base having the same diameter than the top, the side walls forming a cylinder from the base to the open top and creating an inner and outer portion of the container, the open top having an upper edge defining the outermost circumference of the open top and a living hinge with a flexible radius and two indentations that run the full circumference of the inner portion of the container below the upper edge;
(b) the living hinge molded in the upper edge of the open top attached to the lower receptacle portion and a recessed lid, the living hinge allowing the lid to flex over the open top, the living hinge having a straight flex point, the living hinge having flat walls that extend from the straight flex point, and the flat walls extending from the straight flex point having a shape opposite the straight flex point that is contoured to the shape of the inner portion of the container and the edge of the recessed lid so that when the living hinge is closed, the lid securably fits into the indentations that run the full circumference of the inner portion of the container;
(c) the lid having a top surface and a bottom surface of a size and shape to securably fit into the inner circumference of the open top of the container, the circumference around the bottom surface of the lid having a lip extending down from the circumference of the lid, the lip creating a quad seal structure having two ribs on the bottom edge that fit in the indentations that run the full circumference of the inner portion of the container and a top edge that is the same size and shape as the inner circumference of the upper edge of the top that creates a friction fit seal between the lid and the inner bottom portion of the container;
wherein the living hinge permits the lid to bend along a line of the hinge to flexibly secure the lid to the lower receptacle portion of the container to securably contain the contents;

wherein when the living hinge is closed and the lid is flexibly secured to the lower receptacle portion of the container, the lid is fully recessed into the lower receptacle portion of the container;

wherein when the living hinge is closed, the flat walls that extend from the straight flex point lie flat next to each other; and wherein the quad seal ensures that the outer circumference of the lid contacts the inner circumference of the lower receptacle portion of the container via the ribs fitting into the indentations and the edge of the lip contacting the inside of the container to ensure a secure seal.

2. The molded, sealable container of claim 1, wherein the container is made of polypropylene.

3. The molded, sealable container of claim 1, wherein the lid has a small opening opposite the living hinge and to allow liquid to pass through and a breathe hole adjacent to the living hinge to allow for the smooth flow of liquid.

4. The molded, sealable container of claim 1, wherein the base of the inner portion of the container has a concentrically molded ring extending the circumference of the inner portion of the container on the sidewall just above the base wherein the concentrically molded ring allows containers to be stacked together and easily removed.

5. The molded, sealable container of claim 1, wherein the upper edge of the container has a break in the circumference to accommodate the living hinge, the break in the circumference having two arcuate edges on either side of the living hinge extending from the flexible radius of the living hinge up to the upper edge.

6. The molded, sealable container of claim 1 having a label wrapped around the lower receptacle portion.

7. The molded, sealable container of claim 1 having a built-in insulation sleeve comprised of vertical concentric ribs.

8. An injection molded, sealable container for holding non-food items comprising a lower, receptacle portion having a base, an open top, and side walls in between the base and the open top, the side walls extending from the base to the open top and creating an inner and outer portion of the container, the open top having an upper edge defining the outermost circumference of the open top and a living hinge with a flexible radius and channel with two or more indentations that run the full circumference of the inner portion of the container below the upper edge;

the living hinge molded in the upper edge of the open top attached to the lower receptacle portion and a recessed lid, the living hinge allowing the lid to flex over the open top, the living hinge having a straight flex point, the living hinge having flat walls that extend from the straight flex point, and the flat walls extending from the straight flex point having a shape opposite the straight flex point that is contoured to the shape of the inner portion of the container and the edge of the recessed lid so that when the living hinge is closed, the lid securably fits into the channel and indentations that run the full circumference of the inner portion of the container;

the lid having a top surface and a bottom surface of a size and shape to securably fit into the inner circumference of the open top of the container, the circumference around the bottom surface of the lid having a lip extending down from the circumference of the lid that fits within the channel in the base when closed, the lip creating a quad seal structure having two or more ribs on the bottom edge that fit into the channel and into the indentations that run the full circumference of the inner portion of the container and a top edge that is the same size and shape as the inner circumference of the upper edge of the top;

wherein when the living hinge is closed and the lid is flexibly secured to the lower receptacle portion of the container and the lid is fully recessed into the lower receptacle portion of the container, and the lip of the lid is fully recessed and secured into the channel in the base of the container;

wherein when the living hinge is closed, the flat walls that extend from the straight flex point lie flat next to each other; and wherein the living hinge permits the lid to bend along a line of the hinge to flexibly secure the lid to the container and prevent leakage of the contents held therein.

9. The container of claim 8, wherein the base is rectangular.

10. The container of claim 8, wherein the base is square.

11. The container of claim 8, wherein there is an opening in the lid.

12. The container of claim 8, wherein the container is made of polypropylene.

\* \* \* \* \*